(12) United States Patent
Beutel et al.

(10) Patent No.: US 7,270,909 B2
(45) Date of Patent: Sep. 18, 2007

(54) BIPOLAR PLATE HAVING OFFSETS

(75) Inventors: Matthew J. Beutel, Webster, NY (US); Daniel J. Darga, Victor, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/218,930

(22) Filed: Sep. 2, 2005

(65) Prior Publication Data

US 2006/0051654 A1    Mar. 9, 2006

Related U.S. Application Data

(60) Provisional application No. 60/607,114, filed on Sep. 3, 2004.

(51) Int. Cl.
    *H01M 8/02*    (2006.01)
(52) U.S. Cl. .......................................... 429/38; 429/39
(58) Field of Classification Search ................. 429/34, 429/38, 39
    See application file for complete search history.

(56) References Cited

U.S. PATENT DOCUMENTS

| | | | | |
|---|---|---|---|---|
| 4,758,481 A | * | 7/1988 | Fauvel | 429/39 |
| 5,750,281 A | * | 5/1998 | Washington et al. | 429/39 |
| 6,348,280 B1 | * | 2/2002 | Maeda et al. | 429/38 |
| 6,406,809 B1 | * | 6/2002 | Fujii et al. | 429/34 |
| 6,410,179 B1 | * | 6/2002 | Boyer et al. | 429/39 |
| 6,699,614 B2 | * | 3/2004 | Rock | 429/39 |
| 6,773,841 B2 | * | 8/2004 | Rapaport et al. | 429/38 X |
| 2004/0209150 A1 | * | 10/2004 | Rock et al. | 429/38 |

* cited by examiner

*Primary Examiner*—Stephen J. Kalafut
(74) *Attorney, Agent, or Firm*—John A. Miller; Miller IP Group, PLC

(57) ABSTRACT

A bipolar plate for a PEM fuel cell is disclosed. The plate includes a plurality of channels, wherein the ends of the channels are staggered. The plate also includes a plurality of tunnels, wherein the ends of the tunnels are staggered. The plate further includes a cathode and an anode, wherein a portion of the cathode overhangs a portion of the anode. These staggered/offset features allow for an increase the capillary meniscus of water droplets passing therethrough, allowing for a reduction in the pressure required to move the water through the cell and out to the header volume of the stack.

22 Claims, 3 Drawing Sheets

BIPOLAR PLATE HAVING OFFSETS

CROSS-REFERENCE TO RELATED APPLICATION

The instant application claims priority to U.S. Provisional Patent Application Ser. No. 60/607,114, filed Sep. 3, 2004, the entire specification of which is expressly incorporated herein by reference.

FIELD OF THE INVENTION

The present invention relates generally to PEM fuel cells and more particularly to bipolar plates for PEM fuel cells that incorporate staggered features for enhanced water management.

BACKGROUND OF THE INVENTION

Fuel cells include three components: a cathode, an anode, and an electrolyte that is sandwiched between the cathode and the anode and passes only protons. Each electrode is typically coated on one side by a catalyst. In operation, the catalyst on the anode splits hydrogen into electrons and protons. The electrons are distributed as electric current from the anode, through an electrical load (e.g., a drive motor) and then to the cathode, where as the protons migrate from the anode, through the electrolyte to the cathode. The catalyst on the cathode combines the protons with electrons returning from the electrical load (e.g., a drive motor) and oxygen from the air to form water. Individual fuel cells can be stacked together in a series to generate increasing larger quantities (i.e., voltages) of electricity.

In a Polymer-Electrolyte-Membrane (PEM) fuel cell, a polymer electrode membrane serves as the electrolyte between a cathode and an anode. The polymer electrode membrane currently being used in fuel cell applications requires a certain level of humidity to facilitate proton conductivity. Therefore, maintaining the proper level of humidity in the membrane, through humidity-water management, is desirable for proper (or optimal) function and extended durability (or life) of the fuel cell.

In order to prevent leakage of the hydrogen gas and oxygen gas supplied to the electrodes and prevent mixing of the gases, a gas sealing material and gaskets are arranged on the periphery of the electrodes, with the polymer electrolyte membrane sandwiched therebetween. The sealing material and gaskets are assembled into a single part together with the electrodes and polymer electrolyte membrane to form a membrane electrode assembly (MEA). Disposed outside of the MEA, are conductive separator plates for mechanically securing the MEA and electrically connecting adjacent MEAs in series. A portion of the separator plate, which is disposed in contact with the MEA, is provided with a gas passage for supplying hydrogen or oxygen fuel gas to the electrode surface and removing generated water.

The presence of liquid water in automotive fuel cells is typically common because appreciable quantities of water are generated as a by-product of the electro-chemical reactions during fuel cell operation. Furthermore, saturation of the fuel cell membranes with water can result from rapid changes in temperature, relative humidity, and operating and shutdown conditions. Excessive membrane hydration may result in flooding, excessive swelling of the membranes and the formation of differential pressure gradients across the fuel cell stack.

Cell performance is influenced by the formation of liquid water or by dehydration of the ionic exchange membrane. Water management and the reactant distribution have a major impact on the performance and durability of fuel cells. Cell degradation with mass transport losses due to poor water management still remains a concern for automotive and other applications. Long exposure of the membrane to liquid water can also cause irreversible material degradation. Water management strategies such as pressure drop (e.g., gas flow velocity and/or pressure drop across the membrane), temperature gradients and counter flow operations have been implemented and been found to improve mass transport to some extent especially at high current densities. Good water management, however, is still needed for optimal performance and durability of a fuel cell stack.

SUMMARY OF THE INVENTION

According to one embodiment of the present invention, there is provided a bipolar plate for a fuel cell. The bipolar plate comprises a plurality of channels on the plate wherein the ends of the channels are staggered.

According to another embodiment of the present invention, there is provided a bipolar plate for a fuel cell. The bipolar plate comprises a plurality of tunnels on the plate wherein the ends of the tunnels are staggered.

According to yet another embodiment of the present invention, there is provided a bipolar plate for a fuel cell. The bipolar plate comprises an anode plate. The bipolar plate further comprises a cathode plate. A portion of one of the anode plate and the cathode plate overhangs a portion of the other of the cathode plate and the anode plate, respectively.

In accordance with one aspect of the present invention, a fuel cell is provided, comprising a bipolar plate for a fuel cell including at least two channels formed on a surface of said plate, wherein said channels include end portions, wherein said end portions are staggered relative to one another.

In accordance with another aspect of the present invention, a fuel cell is provided, comprising: (1) a bipolar plate for a fuel cell including at least two channels formed on a surface of said plate, wherein said channels include end portions, wherein said end portions of said channels are staggered relative to one another; and (2) at least two tunnels formed on said surface of said plate, wherein said tunnels include end portions, wherein said end portions of said tunnels are staggered relative to one another.

In accordance with yet another one aspect of the present invention, a fuel cell is provided, comprising: (1) a bipolar plate for a fuel cell including at least two channels formed on a surface of said plate, wherein said channels include end portions, wherein said end portions of said channels are staggered relative to one another; (2) at least two tunnels formed on said surface of said plate, wherein said tunnels include end portions, wherein said end portions of said tunnels are staggered relative to one another; (3) an anode portion; and (4) a cathode portion, wherein a portion of either of said anode portion or said cathode portion overhangs another portion of either of said anode portion or said cathode portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
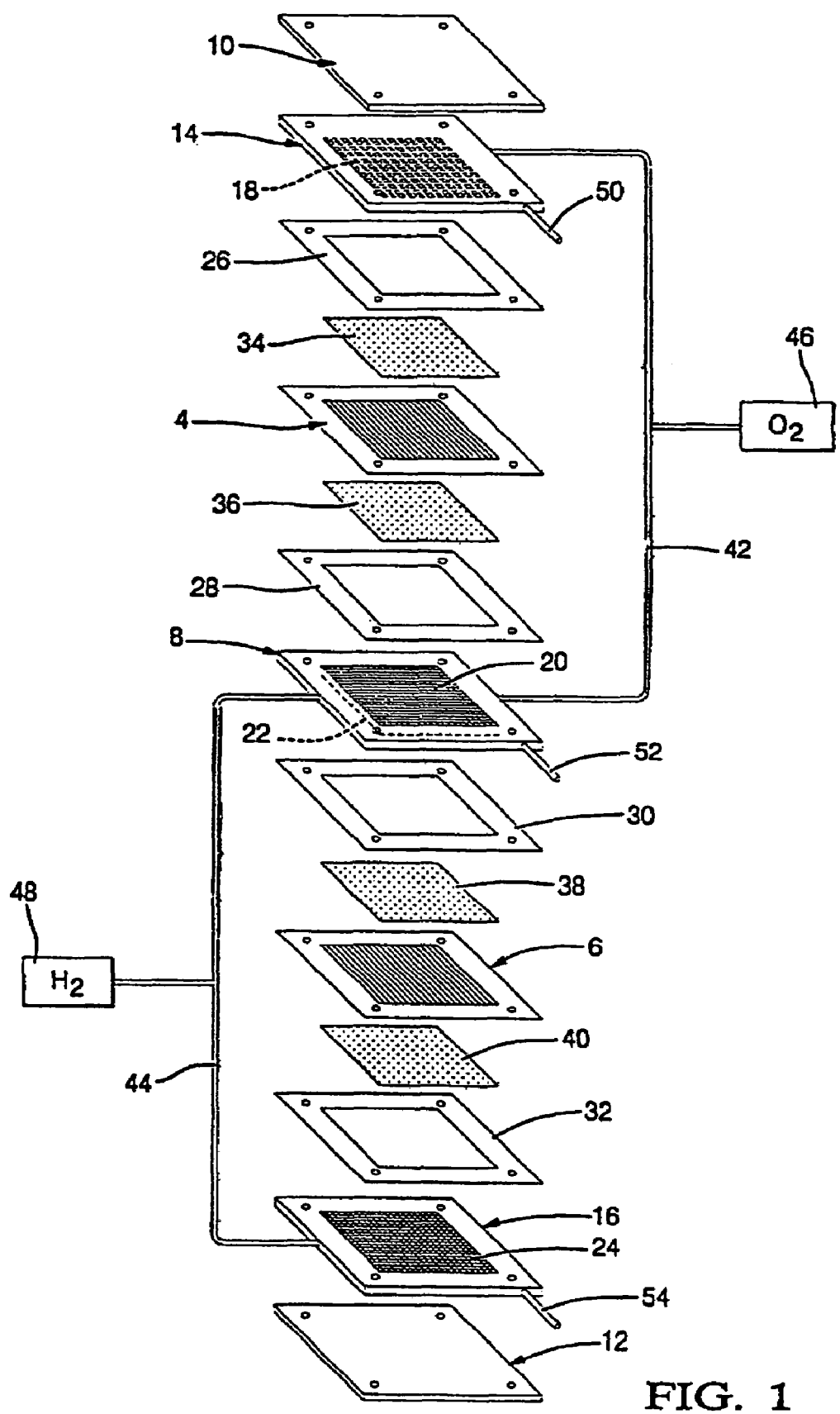
FIG. 1 is a schematic exploded illustration of a PEM fuel stack, in accordance with the general teachings of the present invention.

With reference to FIG. 1, a partial PEM fuel cell stack is schematically illustrated having a pair of membrane electrode assemblies (MEAs) 4, 6 separated from each other by a non-porous, electrically conductive bipolar separator plate 8. MEAs 4, 6 and separator plate 8 are stacked together between clamping plates 10, 12, and monopolar separator plates 14, 16. The clamping plates 10, 12 can be comprised of any number of materials, such as but not limited to metals, such as but not limited to stainless steel. Separator plates 8, 14, 16, each contain flow fields 18, 20, 22, 24 having a plurality of channels formed in the faces of the plates for distributing fuel and oxidant gases (i.e., $H_2$ and $O_2$) to the reactive faces of MEAs 4, 6. Nonconductive gaskets or seals 26, 28, 30, 32 seal and electrically insulate plates 8, 14, 16 of the fuel cell stack. Primary current collectors 34, 36, 38, 40 are formed of porous, gas-permeable, electrically-conductive sheets which press up against the reactive faces of MEAs 4, 6. Primary current collectors 34, 36, 38, 40 also provide mechanical supports for MEAs 4, 6 particularly at locations where the MEAs are otherwise unsupported across the flow channels in the flow field. Suitable primary current collectors include carbon/graphite paper/cloth, fine mesh noble metal screens, open cell noble metal foams, and the like which conduct current from the electrodes while allowing fuel and oxidant gas to pass therethrough, as well as allowing liquid water and water vapor transfer.

Separator plates 14, 16 press up against primary current collectors 34, 40, respectively, while separator plate 8 presses up against primary current collector 36 on the anode face of MEA 4 and against the primary current collector 38 on the cathode face of MEA 6. Oxygen is supplied to the cathode side of the fuel cell stack from a storage tank 46 via appropriate supply plumbing 42, while hydrogen is supplied to the anode side of the fuel cell from a storage tank 48, via appropriate supply plumbing 44. The $O_2$ tank 46 may be eliminated and air supplied to the cathode side from the ambient, and the $H_2$ tank 48 may be eliminated and hydrogen supplied to the anode from a reforming system which catalytically generates hydrogen from liquid or gaseous hydrocarbons (e.g., methanol, natural gas or gasoline). Exhaust plumbing (not shown) for both the $H_2$ and $O_2$/air sides of MEAs 4, 6 is also be provided for removing $H_2$-depleted anode gas from the anode flow field and $O_2$-depleted cathode gas from the cathode flow field (as well as removing $H_2O$ byproducts from both streams). Additional plumbing 50, 52, 54 is provided for circulating liquid coolant through plates 8, 14, 16 as may be needed.

It is well known that in a fuel cell stack at the cathode side, the fuel cell generates water in the catalyst layer. The water must leave the electrode. Typically, the water leaves the electrode through the many channels of the element or bipolar plate 8. Typically, air passes through the channels and pushes the water through the channels. A problem that can arise is that the water creates a slug in the channels and air cannot get to the electrodes. When this occurs, the catalyst layer near the water slug will not work. When a water slug forms, the catalyst layer near the slug becomes ineffective. This condition is sometimes referred to as flooding of the fuel cell. The result of flooding is a voltage drop that creates a low voltage cell in the stack.

A similar phenomenon holds true on the anode side of the cell. On the anode side of the cell, hydrogen can push the water through the channels of the element or bipolar plate 8.

Often times, when a voltage drop occurs, the voltage drop continues to worsen. When one of the channels in the plate 8 becomes clogged, the oxygen or hydrogen flow rate passing through the other channels in this or other cells within the same stack increases. Eventually, the fuel cell saturates with water and may flood. Because the stack is in series electrically, eventually the whole fuel cell stack may flood with water eventually damaging the fuel cell. Accordingly, it is desirable to improve the water management on the fuel cells enough to increase the fuel cell efficiency.

One attempt to solve the problem has been to increase the velocity of the gas, air on one side or hydrogen on the other, to move the water through the channels. However, this is an inefficient method (on a system level) for clearing the water from the channels. As more fully set forth below, it is desirable to incorporate offset features on the channel and tunnel ends and to offset or overhang a portion of the cathode relative to the anode to increase the capillary meniscus of the water moving through the bipolar plate to reduce the capillary pressure required to push the water from the bipolar plate. By the term "meniscus," as that term is used herein, it is meant the span or area of the leading surface of a water bead.

Figure 2:
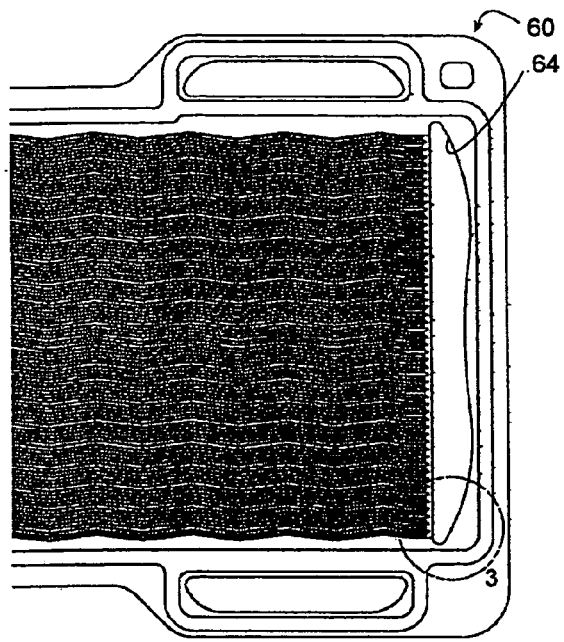
FIG. 2 is a plan view of a bipolar plate, partially broken away, in accordance with the general teachings of the present invention.
Figure 3:
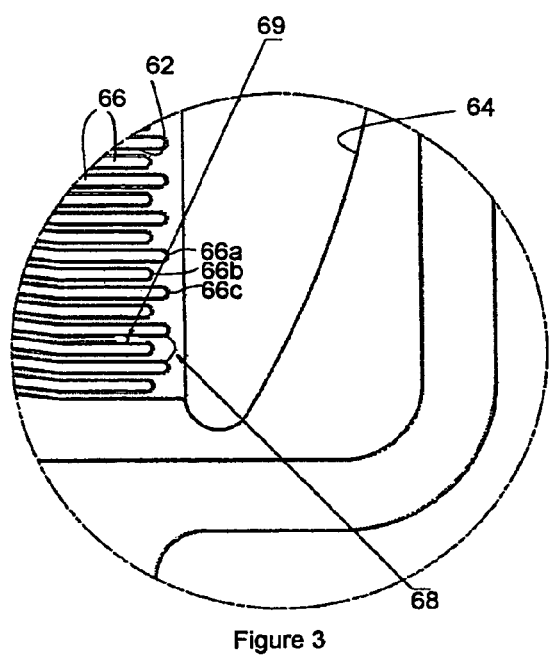
FIG. 3 is an enlarged view of section 3 from FIG. 2, in accordance with the general teachings of the present invention.

FIG. 2 is a plan view of a bipolar plate generally indicated at 60. FIG. 3 is an enlarged view of section 3 from FIG. 2. On a surface thereof, the bipolar plate 60 includes at least two and/or a plurality of channels 62 defined between adjacent rises 66, as best seen in FIG. 3. A gas feed opening 64 is provided near the ends of the channels 62. The gas feed opening 64 comprises the header volume of the stack.

As best viewed in FIG. 3, the ends of the channels 62 are staggered or offset. This is accomplished by having a rise 66a extend to a location relatively nearer the gas feed opening 64 than the next adjacent rise 66b. The next adjacent rise 66c again extends to a position nearer the gas feed opening 64. This pattern can be repeated to stagger the ends of the channels 62. The ends of the channels are staggered to create a larger capillary meniscus for water drops or slugs leaving the flow channels 62. The increased capillary meniscus is schematically indicated at 68 in FIG. 3. The channel meniscus is schematically indicated at 69 in FIG. 3.

By increasing the capillary radius of the channel exit, the resultant force or pressure of gas needed to push the meniscus through the channel 62 outlet is reduced. This helps reduce the water pinning point effect on the channel exits.

It is preferred that the lengths of the rises 66 be equal. This creates equal length channels 62 and helps keep the channel-to-channel pressure drops equal. Because each channel is of equal length, the inlet ends of the channels (not shown) are also staggered in the same manner as the outlet ends as described above. However, it should be appreciated that the present invention can also be practiced wherein the inlet ends of the channels are not staggered. It will also be appreciated that while it is preferred that the lengths of the rises 66 be equal, alternate rises 66 may be longer than the next adjacent rise to achieve the staggering of the channel exits.

Figure 4:
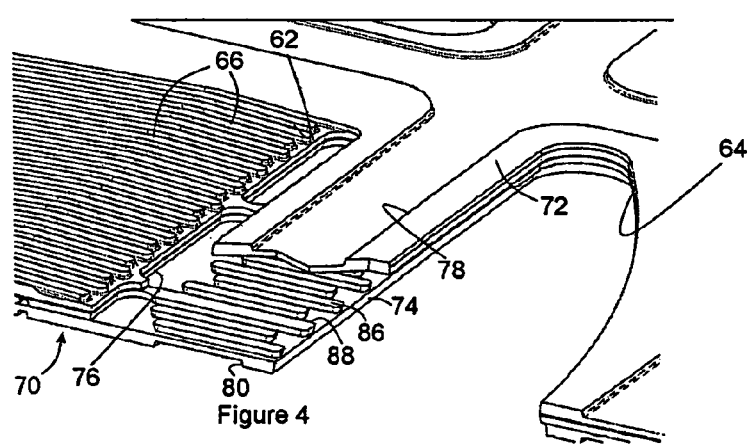
FIG. 4 is a cross-sectional view of a bipolar plate partially broken away, in accordance with the general teachings of the present invention.

FIG. 4 shows a cross-sectional view of a bipolar plate generally indicated at 70. The bipolar plate includes a cathode 72 and an anode 74. The rises 66 are disposed between the cathode 72 and anode 74. As shown, the ends of the channels 62 are staggered in the manner set forth above. At least two and/or a plurality of flow field openings 76 are disposed adjacent the ends of the channels 62. The flow field openings 76 are disposed such that fluid passing therethrough can only flow upwardly as viewed in FIGS. 4 and 6. Fluid cannot pass downwardly past the anode 74. However, it should be appreciated that the fluid direction can be reversed, i.e., fluid can flow from the area adjacent to channel 62/rise 66 to flow field opening 76 to gas feed opening 64 or from gas feed opening 64 to flow field opening 76 to channel 62/rise 66. In either flow direction case, anode 74 directs flow accordingly.

The cathode 72 contains a groove 78 for receiving a gasket, not shown. Similarly, the anode 74 contains a groove 80 for receiving a gasket, not shown. The gaskets disposed in the grooves 78, 80 provide a seal between cathode and anode and the next adjacent fuel cell elements, respectively.

As shown in FIG. 4, the gas feed opening 64 is spaced from the flow field openings 76. Fluid communication is maintained between the flow field openings 76 and gas feed opening 64. In order to maintain such fluid communication, at least two and/or a plurality of rises 86 are disposed between the cathode 72 and anode 74. At least two and/or a plurality of tunnels 88 are disposed between adjacent rises 86. The ends of the tunnels 88 can be offset or staggered in the same manner that the ends of the channels 62 are offset or staggered as described above. This staggering of the ends of the tunnels 88 create a larger capillary meniscus for water drops or slugs leaving the tunnel. Again, this allows the resultant force or pressure of the fluid needed to push the meniscus through the tunnel outlet to be reduced, thus decreasing the water pinning point effect at the tunnel exits.

As shown in FIG. 4 it is preferred that both the inlet and outlet ends of the tunnels 88 be staggered, however it should be appreciated that there can be cases where it is preferable to keep the tunnel inlets even while staggering the exits. This helps keep the channel-to-channel pressure drop equal. This is accomplished by using rises 86 of the same length and offsetting them in the manner shown. It will be appreciated, however that the rises 86 may be of differing length.

Figure 5:
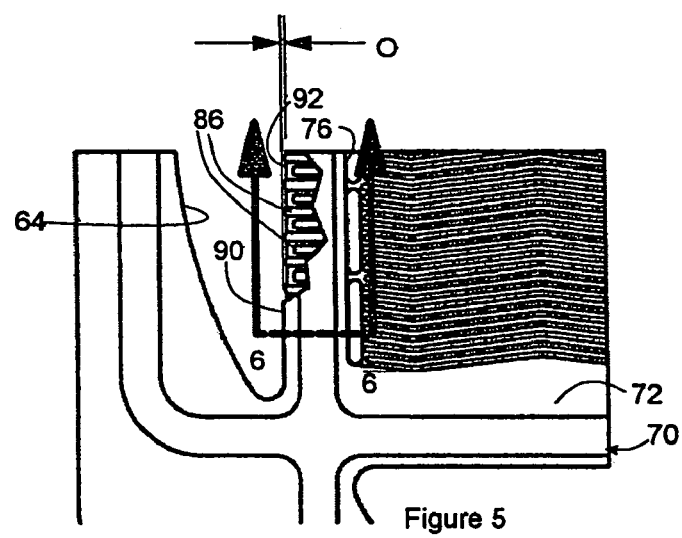
FIG. 5 is a plan view of the bipolar plate, partially broken away, in accordance with the general teachings of the present invention.
Figure 6:
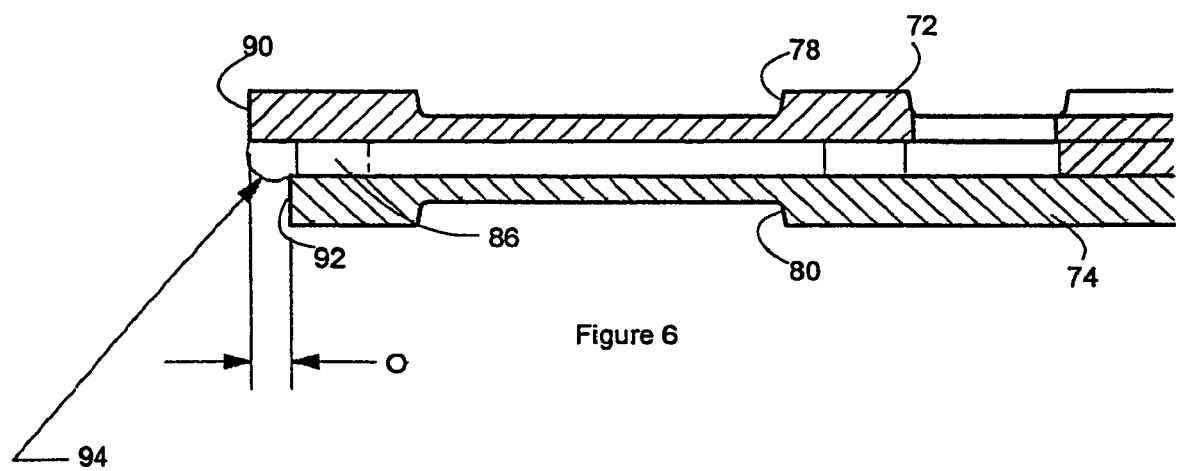
FIG. 6 is a cross sectional view taken along line 6-6 of FIG. 5, in accordance with the general teachings of the present invention.

FIG. 5 is a plan view of the bipolar plate 70, partially broken away. FIG. 6 is a cross sectional view taken along lines 6-6 of FIG. 5. FIGS. 5 and 6 show another feature of the present invention. The interface between the cathode 72 and anode 74 is offset. As shown the edge 90 of the cathode 72 is offset from or overhangs the edge 92 of the anode 74 adjacent the gas feed opening 64. This offset is depicted by the reference symbol O in FIGS. 5 and 6.

The offsetting of the exit edges 90, 92 creates an overhang that will also create a larger edge-to-edge distance, which in turn allows for a longer meniscus distance as the water drop or slug travels from the main area of the cell to the header volume of the stack. The droplet meniscus is figuratively shown at 94 in FIG. 6. This allows for a reduction in the amount of pressure needed to push the meniscus into the header volume of the stack.

It is also preferred that the flow of gas, vapor and/or liquids be directed from the recessed edge 92 toward the overhang edge 90. This effectively creates a shear edge for the water droplet.

As shown in FIGS. 5 and 6, the edge 90 of the cathode 72 overhangs the edge 92 of the anode 74. It will be appreciated that the offset could be in the opposite direction. That is, the edge 92 of the anode 74 could overhang the edge 90 of the cathode 72. It should be appreciated that flow direction can also be reversed in either case.

The staggered or offset features above have been discussed in connection with the ends of the channel 62, the ends of the tunnels 88 and the edges 90, 92 of the cathode 72 and anode 74, respectively. It will be appreciated that this feature can be implemented wherever a pinning point may occur.

While the present invention has been disclosed and described in terms of various specific embodiments, these preferred embodiments are not intended to limit the invention set forth in the claims which follow.

What is claimed is:

1. A bipolar plate comprising a plurality of rises defining a plurality of flow channels therebetween, each flow channel terminating at an end proximate one of a gas feed opening and a flow field opening of said bipolar plate, wherein a first rise between a first flow channel and a second flow channel extends closer to one of the gas feed opening and the flow field opening than a second rise between the second flow channel and a third flow channel, and wherein a third rise between the third flow channel and a fourth flow channel extends closer to one of the gas feed opening and the flow field opening than the second rise to produce a staggered pattern in which the end of one flow channel of said plurality of flow channels is offset from the end of an adjacent flow channel, thereby providing a capillary meniscus for water drops leaving the plurality of flow channels.

2. A bipolar plate as set forth in claim 1, wherein each flow channel is equal in length.

3. A bipolar plate as set forth in claim 1, wherein each rise is equal in length.

4. A bipolar plate as set forth in claim 1, wherein the first rise and the third rise are equal in length.

5. A bipolar plate, comprising:
a cathode;
an anode;
a gas feed opening spaced from a flow field opening; and
a plurality of rises disposed between said cathode and said anode, the plurality of rises defining a plurality of tunnels therebetween, each tunnel terminating at an end proximate one of the gas feed opening and the flow field opening of said bipolar plate, wherein a first rise between a first tunnel and a second tunnel extends closer to one of the gas feed opening and the flow field opening than a second rise between the second tunnel and a third tunnel, and wherein a third rise between the third tunnel and a fourth tunnel extends closer to one of the gas feed opening and the flow field opening than the second rise to produce a staggered pattern in which the end of one tunnel of said plurality of tunnels is offset from the end of an adjacent tunnel, thereby providing a capillary meniscus for water drops leaving the plurality of tunnels.

6. A bipolar plate as set forth in claim 5, wherein each tunnel is equal in length.

7. A bipolar plate as set forth in claim 5, wherein each rise is equal in length.

8. A bipolar plate as set forth in claim 5, wherein the first rise and the third rise are equal in length.

9. A bipolar plate as set forth in claim 5, further comprising a plurality of flow field openings.

10. A bipolar plate, comprising:
a cathode having an exit edge adjacent a gas feed opening;
an anode having an exit edge adjacent the gas feed opening; and
a flow field opening spaced from the gas feed opening; and
wherein the exit edge of the cathode is offset from the exit edge of the anode, thereby providing a capillary meniscus for water drops leaving the plurality of tunnels.

11. A bipolar plate as set forth in claim 10, further comprising a plurality of rises disposed between said cathode and said anode, the plurality of rises defining a plurality of channels therebetween.

12. A bipolar plate as set forth in claim 11, wherein each flow channel terminates at an end proximate one of the gas feed opening and the flow field opening of said bipolar plate, wherein a first rise between a first flow channel and a second flow channel extends closer to one of the gas feed opening and the flow field opening than a second rise between the second flow channel and a third flow channel, and wherein a third rise between the third flow channel and a fourth flow channel extends closer to one of the gas feed opening and the flow field opening than the second rise to produce a staggered pattern in which the end of one flow channel of said plurality of flow channels is offset from the end of an adjacent flow channel, thereby providing a capillary meniscus for water drops leaving the plurality of flow channels.

13. A bipolar plate as set forth in claim 12, wherein each channel is equal in length.

14. A bipolar plate as set forth in claim 12, wherein each rise is equal in length.

15. A bipolar plate as set forth in claim 12, wherein the first rise and the third rise are equal in length.

16. A bipolar plate as set forth in claim 12, further comprising a plurality of flow field openings.

17. A bipolar plate as set forth in claim 10, further comprising a plurality of rises disposed between said cathode and said anode, the plurality of rises defining a plurality of tunnels therebetween.

18. A bipolar plate as set forth in claim 10, wherein each tunnel terminates at an end proximate one of the gas feed opening and the flow field opening of said bipolar plate, and wherein a first rise between a first tunnel and a second tunnel extends closer to one of the gas feed opening and the flow field opening than a second rise between the second tunnel and a third tunnel, and wherein a third rise between the third tunnel and a fourth tunnel extends closer to one of the gas feed opening and the flow field opening than the second rise to produce a staggered pattern in which the end of one tunnel of said plurality of tunnels is offset from the end of an adjacent tunnel, thereby providing a capillary meniscus for water drops leaving the plurality of tunnels.

19. A bipolar plate as set forth in claim 18, wherein each tunnel is equal in length.

20. A bipolar plate as set forth in claim 18, wherein each rise is equal in length.

21. A bipolar plate as set forth in claim 18, wherein the first rise and the third rise are equal in length.

22. A bipolar plate as set forth in claim 18, further comprising a plurality of flow field openings.

* * * * *